: US 8,075,238 B2
(45) Date of Patent: Dec. 13, 2011

(12) United States Patent
Wirz et al.

(54) DEVICE AND METHOD FOR RUNNING A WAREHOUSE (75) Inventors: Herbert Wirz, Zuchwil (CH); Rudolf Güdel, Solothurn (CH); Walter Zulauf, Ursenbach (CH)

(73) Assignee: Gudel Group AG, Langenthal (CH)

( * ) Notice: Subject to any disclaimer, the term of this patent is extended or adjusted under 35 U.S.C. 154(b) by 631 days.

(21) Appl. No.: 10/553,210

(22) PCT Filed: Apr. 14, 2004

(86) PCT No.: PCT/CH2004/000228
§ 371 (c)(1),
(2), (4) Date: Oct. 13, 2005

(87) PCT Pub. No.: WO2004/089787
PCT Pub. Date: Oct. 21, 2004

(65) Prior Publication Data
US 2007/0041815 A1 Feb. 22, 2007

(30) Foreign Application Priority Data
Apr. 14, 2003 (EP) .................................... 03405259

(51) Int. Cl.
*B65G 1/04* (2006.01)
(52) U.S. Cl. ..................... 414/281; 414/626; 414/790.2; 294/119.1
(58) Field of Classification Search .................. 414/281, 414/282, 331.11, 789.7, 789.9, 790.2, 626; 294/119.1
See application file for complete search history.

(56) References Cited

U.S. PATENT DOCUMENTS

| 2,701,065 A | | 2/1955 | Bertel | |
|---|---|---|---|---|
| 2,735,713 A | * | 2/1956 | Blakeley | ..................... 294/119.1 |
| 2,765,928 A | * | 10/1956 | Riemenschneider | ......... 212/319 |
| 2,897,949 A | * | 8/1959 | Huisking | .................... 414/789.1 |
| 4,678,390 A | | 7/1987 | Bonneton et al. | |
| 4,883,401 A | | 11/1989 | Kavieff | |
| 4,992,016 A | * | 2/1991 | Ferloni | ......................... 414/27 |

(Continued)

FOREIGN PATENT DOCUMENTS

DE 26 29 718 A1 1/1978

(Continued)

*Primary Examiner* — James Keenan
(74) *Attorney, Agent, or Firm* — Birch, Stewart, Kolasch & Birch, LLP (57) ABSTRACT

The invention relates to a device and method for running a warehouse in which objects are stored in a number of stacks in a storage area. The device comprises a collecting device (101) with an intermediate storage (102) and a gripping device (103), which can be displaced as desired over the storage area. The intermediate storage (102) can, in separate receiving steps, be successfully filled from different stacks. The gripping device (103) is formed by two vertically displaceable bars (104, 105) that are situated opposite one another and serves to lift one or more objects from one of the stacks. An improved utilization of the available storage space results by virtue of the fact that only the bars (104, 105) are displaced into the stack space.

20 Claims, 8 Drawing Sheets

U.S. PATENT DOCUMENTS

| | | | |
|---|---|---|---|
| 5,032,053 A | | 7/1991 | Krieg |
| 5,211,523 A | * | 5/1993 | Galan et al. ............... 414/282 |
| 5,599,157 A | * | 2/1997 | Ellington ............... 414/501 |
| 5,848,867 A | * | 12/1998 | Gagnon et al. ............ 414/281 |
| 6,061,607 A | | 5/2000 | Bradley et al. |
| 6,290,452 B1 | * | 9/2001 | Wachter ............... 414/788.1 |
| 6,315,513 B1 | * | 11/2001 | Harukawa et al. ........ 414/286 |
| 6,379,096 B1 | * | 4/2002 | Beutler et al. ............ 414/281 |
| 7,329,081 B2 | * | 2/2008 | Baker et al. ............... 414/626 |
| 2004/0165974 A1 | * | 8/2004 | Gironi et al. ............... 414/281 |
| 2006/0056951 A1 | * | 3/2006 | Williamson et al. ........ 414/626 |

FOREIGN PATENT DOCUMENTS

| | | |
|---|---|---|
| DE | 39 19 932 A1 | 12/1990 |
| EP | 0 288 426 A2 | 10/1988 |
| EP | 0 767 113 A2 | 4/1997 |

\* cited by examiner

DEVICE AND METHOD FOR RUNNING A WAREHOUSE

TECHNICAL FIELD

The invention relates to an arrangement for running a warehouse, in which objects are stored in a plurality of stacks in a storage area, comprising a collecting device, which can be moved as desired over the storage area, comprising an intermediate store arranged on the collecting device to accommodate objects to be picked up from the storage area, it being possible for the intermediate store to be filled successively from various stacks in separate pick-up steps, and comprising a gripping device arranged on the collecting device for lifting one or more objects from one of the stacks, it being possible for the gripping device to be moved vertically. The invention also relates to a method for running a warehouse, in particular with the arrangement according to the invention.

PRIOR ART

The running of warehouses is often carried out in an automated manner nowadays. As compared with manual running, this permits faster and more logical assembly of goods orders which, for example, are to be delivered to customers. High-rack stores, in which a large number of different objects are stored and can be picked for an order by means of robots, are known. Because of the rack construction, however, such stores are expensive and require robots with a complicated construction. The storage of objects which can be stacked or can easily be packed or put into stackable containers, for example boxes, is therefore advantageously carried out in a plurality of stacks which are arranged in a storage area.

U.S. Pat. No. 2,701,065 (C. A. Bertel) shows a device for storing and handling stackable containers. This provides for a first lifting unit which can be moved above the storage area, which can lift and hold a part of a stack, and also a second lifting unit, which can lift and hold that container which is located immediately below the lifted part of the stack. Then, if a container from a stack is to be set down on the floor at a specific location, in order for example to unload it, then the further containers which may be stored on it are lifted by the first lifting unit and the container is gripped by the second lifting unit, displaced to the specific location and set down there.

DE 26 29 718 (Fried. Krupp GmbH) describes a method and a device for transferring stackable containers, which provides a mobile lifting appliance which is capable of lifting all or all but one container of a stack above the stack height. Once all the containers of a stack have been lifted, an additional container can be supplied underneath them; if the lowest container of the stack is not lifted, it can be moved away after lifting the remainder of the stack. The lifting appliance is moved on rails, which can be arranged below or above the stack height.

The disadvantage with the aforementioned methods and devices is their lack of flexibility. The stacks or part stacks lifted have to be transported as a whole; they cannot be supplemented with objects from further stacks. This results in a great loss of time when assembling goods orders.

EP 0 767 113 (Cimcorp) specifies a system and a method in which a robot can be moved over the working area and comprises a vertically movable gripping device. The latter has a tower-like load-lifting device, which can embrace a plurality of stacked objects and is provided with gripping means at its lower end. Then, if a part stack is to be picked up, the tower-like load-lifting device is positioned above the stack and moved vertically downward until the gripping means are able to grip the lowest object to be lifted. In this way, a stack of objects from a plurality of stacks can now be assembled in the load-lifting device.

However, in this system and method, it is disadvantageous that free spaces have to remain on all sides between the individual stacks in order that the gripping device with the tower-like load-lifting device does not collide with adjacent stacks when being lowered. This results in poor utilization of the available storage space.

SUMMARY OF THE INVENTION

It is an object at the invention to provide an arrangement and a method belonging to the technical field mentioned at the beginning which permit improved utilization of the available storage space.

The achievement of the object is defined by the features of claim 1. According to the invention, the gripping device for lifting one or more objects out of one of the stacks is substantially formed by two mutually opposite blades. The blades extend substantially in each case along one side of the object to be picked up and do not project beyond this side.

This has the advantage that, in order to pick up objects (e.g. boxes) of a stack, the blades merely have to be moved downward to such an extent that they reach in between the stacks. The blades require a free space only on two opposite sides of the stack to be lifted. Along the other two opposite sides, the device does not reach into the stack area. As a result, the utilization of the storage space is improved considerably. Moreover, the blades permit the objects to be picked up both along their main direction and at right angles thereto. Depending on the dimensions and subdivision of the storage space, the utilization of the available space can be improved still further by an optimum choice of the alignment.

The store can comprise a plurality of storage areas, which each contain a specific group of goods or are covered by a single collecting device. To the same extent, a plurality of collecting devices can operate in the same storage area.

The collecting device is preferably moved over the storage area by a portal robot but, for example, bent-arm robots can also be provided or other known arrangements which are able to move the collecting device into any desired position above the storage area.

The collecting device is advantageously divided into two mutually opposite halves which can be moved relative to each other. This division is benefited by the construction of the gripping device according to the invention with two blades. It permits, firstly, simple and rapid adaptation to various container sizes. The distance between the two halves and therefore the distance between the blades and also the size of the intermediate store can be adapted to the stored objects, for example in an automated manner. This offers a time advantage if the container size changes and also permits the processing of a plurality of container sizes in the same storage area by means of the same collecting device.

On the other hand, two halves that can be moved relative to each other can be used to hold the stack part to be lifted in the gripping device and/or the stack part in the intermediate store. To this end, the mutually opposite halves are moved toward each other until the blades and/or halves of the intermediate store hold the appropriate stack part with a form or force fit. As a result, the number of components needed and therefore the complexity of the arrangement are reduced.

The halves of the collecting device are moved relative to each other in particular by means of pneumatic cylinders or servo controlled axes.

The intermediate store is preferably substantially formed by two mutually opposite side beams. This firstly reduces the mass of the collecting device to be moved and, as a result, is energetically advantageous. Secondly, the simple adaptability of the collecting unit to various container sizes is improved further.

For instance, the size of the intermediate store can be adapted to a new container size by means of a relative movement of the two side beams in relation to each other. Because the objects are only held on two of their sides, their dimension parallel to these sides is not of critical importance. The intermediate store is able, without adaptation or even in the same operation, to pick up objects which have a different extent in this direction.

If desired, the intermediate store is able to enclose the stored objects on all sides in a known way in the manner of a box or frame, so that, as a result, they are secured against slipping out or tilting over. If the intermediate store does not have to be moved under the stack height in order to pick up the objects, this does not lead to collisions with adjacent stacks and no additional distances between the stacks are needed.

The blades of the gripping device are advantageously mounted in the side beams of the intermediate store such that they can be moved vertically. This permits an object or a stack part to be lifted by the gripping device without the intermediate store and objects already located in the intermediate store first having to be lowered and then lifted again.

As compared with solutions in which the intermediate store has to be lowered completely, the moved mass is reduced and, as a result, the power consumption is lowered. In addition, as a result of the reduced inertia of the moved elements, the dynamics of the arrangement are improved, that is to say movements of the gripping device can be carried out more quickly, in particular if the gripping device is empty. Advantageously, therefore, all the containers picked up are displaced into the intermediate store and additional containers are gripped with an empty gripping device.

The blades and the side beams of the intermediate store can be arranged in such a way that the vertical planes which are formed by them enclose a space with a substantially rectangular cross section. The dimensions of this space are matched to the objects to be picked up, which, in this case, advantageously likewise have a substantially rectangular cross section. The objects in the intermediate store are therefore secured on two of their sides by means of the blades and on the other two sides by the side beams and are thus prevented from slipping horizontally or tilting. If the lower limit of the intermediate store is not moved under the stack height when picking up the objects, the result is optimal utilization of the storage space in this design as well, in that a certain distance between adjacent stacks has to be provided only for the two blades.

If the intermediate store is formed substantially by two side beams, in this case the blades are advantageously joined on one side to the mounting in the side beams via angled elements.

In order to be able to hold objects when lifting or lowering, the blades preferably comprise holding elements on their inner sides, that is to say on their mutually facing sides, which contact the objects. In order to secure the lifted or lowered objects against slipping or tilting, securing elements are preferably arranged on the inner side of the blades. In this case, the objects can in each case be held and secured by means of a force and/or form fit. The holding and securing elements can additionally be designed to be passive, that is to say immovable with respect to the blades, or else active, that is to say movable.

In particular, (active) pressure plates can be provided as force-fitting holding and securing elements, which act with a certain contact force on two opposite side walls of the object and, in this way, firstly hold it and secondly prevent slippage parallel to the blades and also tilting in this plane. Such pressure plates are advantageously actuated pneumatically. The same function can be fulfilled by form-fitting holding elements. These interact with the outer shape of the objects. Either, in the case of corresponding objects, recesses, bulges or edges which are present in any case are used or the objects (e.g. boxes) are specifically provided with corresponding elements.

If, for example, conventional boxes with a substantially rectangular cross section but rounded corners are stacked, the rounded portions can be utilized for securing the boxes during lifting, by the holding elements of the blades having corresponding (passive) profiles, which extend only slightly or not at all beyond the lateral extent of the boxes and interact with the rounded portions. If desired, the objects can have recesses, for example vertical grooves, on their sides facing the blades, in which a corresponding profile arranged along the blades engages.

Form-fitting and force-fitting securing and holding elements can be combined. For example, the boxes can be held on their underside by a force fit by extendable fingers or pawls at the lower end of the blades, while they are secured on their side surfaces by a force fit by pressure plates arranged on the inner side of the blades.

The intermediate store is preferably arranged in a fixed location above the storage area as the objects are picked up. In order to pick them up, in this case only the blades are moved vertically downward. Since the intermediate store and any objects which may be held therein are not moved vertically in order to pick up further objects, the moved mass and, as a result, the power consumption are minimized.

However, if desired, the intermediate store can also be moved at least partly downward together with the gripping device during each pick-up operation and set down any objects stored on it briefly on the stack from which further objects are to be lifted. In this case, attention is advantageously paid to the lateral border of the intermediate store being as narrow as possible, at least in one direction, so that the storage space can be utilized well. In this case, therefore, an intermediate store is preferably selected which is formed substantially by two mutually opposite side beams.

Even if the intermediate store does not have to be moved in order to pick up objects, it may be advantageous if the intermediate store can be moved vertically. Thus, depending on the current stock in the store, it can specifically be set continuously to a minimum height which is just sufficient to move the collecting device over the entire storage area without any collision with stored stacks. On account of the minimized lifting travel, energy and time can be saved.

In order to stabilize the stack stored in the intermediate store, the intermediate store can comprise at its upper end an element which can be moved vertically and exerts a force vertically downward on the topmost stored object. Together with the holding force which acts from below on the lowest stored object, this prevents both the slippage of individual objects and the tilting of the stored stack or part thereof. The element can also be capable of movement beyond the upper end of the intermediate stack, so that stacks which are higher than the intermediate store can also be stabilized. In the simplest case, the element has a certain mass and merely exerts its weight on the respective topmost object in the intermediate store, a stop being provided in the intermediate store which keeps the element at a certain minimum height when the intermediate store is empty. The element can also be capable of active actuation and pressed onto the topmost stored container with a certain compressive force by a drive, a spring or pneumatically.

The intermediate store advantageously comprises holding elements for holding the stored objects and/or securing elements for securing the stored elements against horizontal movements relative to the intermediate store or against tilting. Such holding elements for preventing slippage or tilting of the objects can in principle be constructed in the same way as the holding elements of the blades but, in a collecting device according to the invention, different holding and securing elements can quite possibly be selected in the intermediate store and in the gripping device.

The intermediate store preferably comprises a calibration part, preferably at its lower end, which corrects the orientation of the objects as they are inserted into the intermediate store.

During the stacking of objects, it may occur that an object is not set down exactly on that lying underneath or that, on account of an unfavorable weight distribution, it is displaced or inclined. In order that such stacking defects cannot lead to any hindrance to the collecting device and therefore the newly formed stacks are as free of defects as possible, the objects picked up and to be set down are aligned in such a way that their boundary surfaces in each case lie in the same plane. This is advantageously carried out at the entry to the intermediate store, which all the transported objects generally have to pass through twice, namely when being picked up and before being set down. If the intermediate store and therefore the adjusting element are not moved vertically below the stack height, no additional regard needs to be paid to the layout of the storage space either when selecting the shape of the adjusting element.

The calibration part is preferably formed by two C-shaped adjusting elements. These embrace the objects at least partly as they are lifted, are matched to their size and therefore force the objects into a predefined orientation. This leads to a defect-free stack.

The C-shaped elements are arranged on the intermediate store in such a way that their bases lie parallel to the side walls and the two outriggers respectively arranged on the bases are oriented inward at right angles thereto.

If the collecting device is designed in such a way that it is divided into two mutually opposite halves, each half comprises an adjusting element in each case. During the adaptation of the collecting device to a specific object cross section, the spacing between the C-shaped adjusting elements therefore also agrees, and only the length of the base has to be adjusted if necessary.

A collecting device advantageously comprises a plurality of intermediate stores. Thus, an object or a stack part can be accommodated in any desired one of the intermediate stores. This offers the advantages that, given the same overall height, more objects can be stored intermediately. In addition, as many stacks as the collecting apparatus comprises intermediate stores can be formed simultaneously with any desired selectable objects. As a result, the travel to be covered by the collecting device and therefore the average time required for forming a new stack is shortened considerably. As compared with the arrangement of a plurality of mutually independent collecting devices in the same storage area, this solution is additionally substantially simpler and more cost-effective.

The arrangement advantageously comprises a storage unit which can be moved independently of the collecting device and which is constructed in such a way that objects accommodated in the intermediate store of the collecting device can be transferred directly into the storage unit. When the collecting device has been filled, it does not have to be moved directly to the intended location of the objects picked up in order to set the latter down there. Instead, the objects can firstly be transferred to the storage unit, which can be moved toward the collecting device for the transfer. The storage unit is expediently dimensioned such that its holding capacity is greater than that of the collecting device, or a plurality of storage units are provided. As a result, the storage units and the collecting device have to be moved to the intended location of the objects, which may possibly be far removed, only when either all the storage units are full or when all the objects to be set down at the intended location have been picked up. This also has the logistic advantage that the intended location occupies greater distances from the collecting device, so that in this region other activities can be carried out largely unimpeded.

The storage units are preferably arranged above the storage area and are fixed in the vertical direction, the height of a storage unit corresponding to the height of the collecting device. In this way, a storage unit can accept the entire content of an intermediate store without a larger free space being needed above the storage area than would be available in any case for the operation of the collecting device.

The storage units can also be used together with collecting devices in which the gripping device is not formed substantially by two mutually opposite blades. For example, with gripping devices which engage around the objects to be picked up on three sides.

The storage unit is preferably substantially C-shaped with a base part running vertically and arranged at the rear, and two holding parts held on the base part, arranged centrally and projecting forward, between which the objects can be picked up. This form of the storage unit is particularly advantageous during the interaction with collecting devices which are formed by two mutually opposite side beams. The objects are held laterally in the intermediate store by the side beams, while they are held in the C-shaped storage unit between the lower and upper holding parts. The collecting device can therefore be moved unimpeded into the storage unit and there transfer the objects directly to the storage unit or pick them up from the storage unit, for example by the side beams of the intermediate store being moved apart briefly.

The upper holding part can preferably be moved in the vertical direction and is pressed onto the topmost object held by means of a spring or pneumatic cylinder, so that the objects stacked in the storage unit are held securely.

A plurality of storage units are preferably fixedly arranged on a portal bridge, and the collecting device is arranged such that it can be moved on a further portal bridge, the storage units and the collecting device being located opposite each other. This permits a large capacity in the storage units and a simple transfer of the objects between the collecting device and the storage units. The objects to be picked up, stored in the storage area, are picked up successively by the collecting device. As soon as the collecting device is full, the portal bridge with the storage units is moved toward the collecting device, so that the transfer of the objects from the intermediate store of the collecting device to one of the storage units can be carried out. The empty collecting device is then ready to pick up further objects again. As soon as a certain number objects has been picked up or as soon as all the storage units are full, the portal bridge having the storage units and the collecting device is moved to the intended location of the objects. There, the objects in the individual storage devices are removed from the collecting device again one after another and set down in the storage area.

In a method for running a store, in which objects are stored in a plurality of stacks in a storage area,
a) a collecting device is moved over the storage area to any desired stack having objects to be picked up;
b) a gripping device arranged on the collecting device to pick up a stack part from one or more objects of the stack is moved vertically downward;
c) the stack part is gripped by two mutually opposite blades of the gripping device;
d) the gripping device is moved vertically upward, so that an intermediate store arranged on the collecting device accommodates the objects picked up from the storage area; and
e) the intermediate store is filled successively from various stacks in further pick-up steps.

Further advantageous embodiments and feature combinations of the invention emerge from the following detailed description and all of the patent claims.

BRIEF DESCRIPTION OF THE DRAWINGS

In the drawings used to explain the exemplary embodiment.

In principle, in the figures identical parts are provided with identical designations.

WAYS OF IMPLEMENTING THE INVENTION

Figure 1:
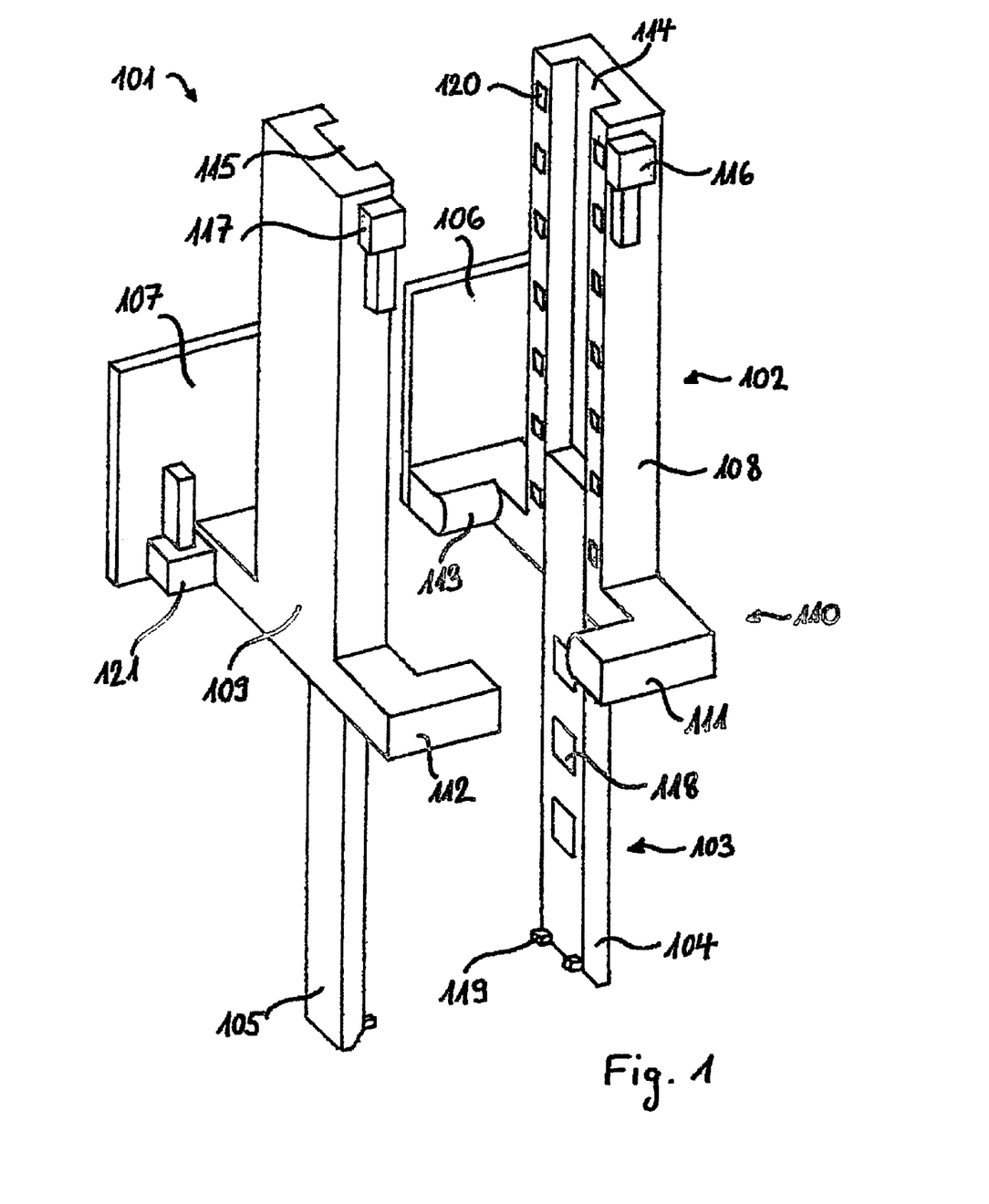
FIG. 1 shows a three-dimensional illustration of a collecting device according to the invention.

FIG. 1 shows a three-dimensional illustration of a collecting device according to the invention. The collecting device 101 comprises an intermediate store 102 and a gripping device 103, which is arranged at the lower end of the intermediate store 102 and can be moved vertically. The collecting device 101 consists of two halves, which are constructed substantially symmetrically in relation to each other. For example, the intermediate store 102 is formed between two side walls 108, 109, while the gripping device 103 comprises two blades 104, 105.

The first blade 104 is mounted in the first side wall 108, the second blade 105 is mounted in the second side wall 109, such that they can be moved vertically. For this purpose, in each case a vertical recess 114, 115 is provided in the side walls 108, 109, its cross section corresponding to the cross section of the blades 104, 105, so that the blades 104, 105 can be guided therein and moved along the recess 114, 115. The inner surfaces of the side walls 108 and 109 and the inner surfaces of the blades 104 and 105 in each case lie in the same plane. In FIG. 1, the blades 104, 105 are shown in the maximum extended position. This is assumed in particular when all the containers of a stack have been picked up or a new stack has been set down on a free area.

The two halves of the collecting device 101 are held independently of each other on separate base plates 106, 107, one of the base plates 107 having a drive 121, with which the base plate 107 can be moved in the horizontal direction relative to the other base plate 106. This permits the distance between the side beams 108, 109 and the blades 104, 105 to be set.

At the lower end of the intermediate store 102, a calibration part 110 is arranged. This comprises two C-shaped adjusting elements 111, 112, which are each arranged on a side wall 108, 109 such that their base lies horizontally in the plane of the side wall 108, 109 and in each case two outriggers having adjusting jaws 113 are oriented horizontally and inward at right angles thereto. The four adjusting jaws 113, the bases of the adjusting elements 111, 112 and the respective lowest part of the side walls 108, 109 define a space which exactly predefines the horizontal position of the containers to be accommodated in the intermediate store 102 or to be discharged from the intermediate store. The inner surfaces of the adjusting jaws 113, which come into contact with the containers, have a rounded shape, the rounded portion being identical upward and downward. As a result, containers transported into the intermediate store 102 from below are pushed gradually and therefore gently into the desired position by the lower rounded portion. To the same extent, containers which are to be set down downward from the intermediate store 102 and have been displaced in the intermediate store 102 for any reason are centered by the upper rounded portion before they leave the intermediate store 102.

The blades 104, 105, which are used to pick up one or more containers from a stack, are moved vertically by drives 116, 117 which are arranged on the side walls 108, 109 of the intermediate store 102. A controller of known type ensures that both blades 104, 105 generally always assume the same vertical position. At their lower end, the blades 104, 105 have fingers 119 which can be sunk in the body of the blades. With the fingers 119 sunk, the blades 104, 105 can be moved vertically downward along a container stack until the lower ends of the blades 104, 105 have reached an engagement position—dependent on the shape of the container—with respect to the lowest container to be gripped. The fingers 119 are then extended, so that the lowest container rests on them. As a result, the container (and any further containers standing on it) is held by the gripping device 103.

By means of the blades 104, 105, which have contact over the entire height on two opposite sides with the stack to be lifted, the containers are secured against tilting and slipping in the direction of the blades 104, 105 during the lifting procedure. In order to secure the gripped containers against slipping horizontally parallel to the blades 104, 105 and, respectively, tilting in the same plane, both blades 104, 105 have pressure plates 118 on their inner side facing the containers. As soon as the containers have been gripped by extending the fingers 119 and before the lifting begins, the pressure plates 118 are extended out of the plane of the inner side of the blades 104, 105, so that the containers are stabilized by a force fit.

During lifting, it may be advantageous for the pressure plates 118 which stabilize a container which is just passing through the calibration part 110 to be released briefly, so that the centering of the container can be carried out unimpeded. At this instant, there is no risk of slippage or tilting, since the container is guided and secured by the C-shaped adjusting elements 111, 112 in addition to the blades 104, 105 and side walls 108, 109.

As soon as the container or the lifted stack part has reached its final position in the intermediate store 102, pressure plates 120, which are arranged on both sides of the recess 114 along the inner side of the side walls 108, 109, are activated and pressed against the containers. In this way, the containers are firstly held at the height reached and secondly secured further against slipping out or tilting. This is because, during movement of the collecting device 101 over the storage area, accelerations and retardations, particularly pronounced in the case of an emergency stop, lead to considerable forces on the containers of the stack in the intermediate store 102. The pressure plates 118 and the fingers 119 of the blades 104, 105 can then be released, so that the blades can once more be moved freely vertically and additional containers can be picked up.

Figure 2:
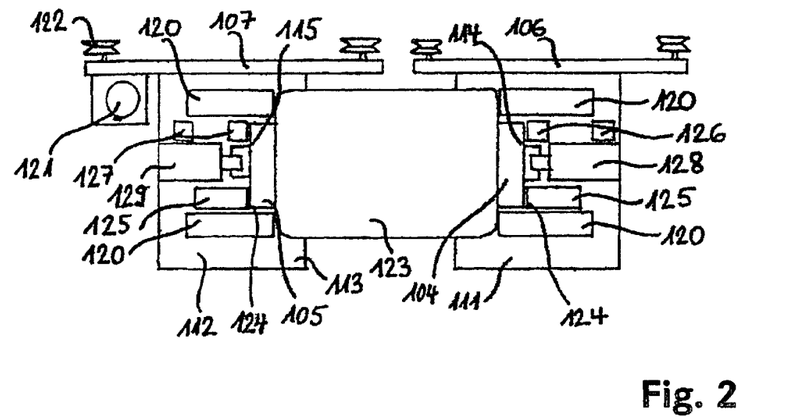
FIG. 2 shows the collecting device according to the invention in cross section.

FIG. 2 shows the collecting device according to the invention in a cross section along a horizontal plane at the height of the calibration part 110. The base plates 106, 107, which carry the collecting device, have guide rollers 122 which interact with guide rails (not shown) of a portal robot which can be moved over a storage area. At least one of the base plates 106, 107 and therefore one half of the collecting device can be displaced along the rail by means of the drive 121, so that the distance between the two halves can be adapted. The other half of the collecting device can be fixed on its rail or joined firmly to the portal robot without a rail.

Easily visible in the cross section are the elements of the collecting device arranged in the side walls 108, 109. The side walls 108, 109 make contact with a container 123 having a substantially rectangular cross section along its two transverse sides. The C-shaped adjusting elements 111, 112 center the container 123 along its transverse direction by acting on sections of its long sides. The cross section is illustrated exactly at that height at which the jaws 113 of the adjusting elements 111, 112 have their greatest extent, and therefore the horizontal position of the container 123 is defined exactly there.

The side walls 108, 109 now have the following elements. The pressure plates 120 for holding and stabilizing the containers 123 stored in the intermediate store 102 are arranged on both sides outside the recess 114, 115. They are actuated pneumatically by pressure pistons. The blades 104, 105 each have on their outer side, which faces the base surface of the recess 114, 115, a rack 124. This interacts with a toothed disk 125, which is actuated by the drive 116, 117, for the purpose of vertical movement of the blades 104, 105. The blades 104, 105 are additionally held in the recess 114, 115 by a guide 128, 129. This is arranged on the base surface of the recess 114, 115 and has a rail which interacts with a groove on the inner side of the blade 104, 105, so that the possible movements of the blades 104, 105 are restricted to the vertical direction along the side wall 108, 109. In the side wall 108, 109, on the side opposite the rack 124, a respective power chain 126, 127 for power transmission is also arranged along the recess 114, 115. This comprises flexible power cables, compressed air hoses or, if appropriate, hydraulic hoses with a length which permits the respective blade 104, 105 to be supplied with appropriate power in all its vertical positions. This power is needed in particular to extend and retract the pressure plates 118 and the fingers 119.

The pressure plates 118 of the blades 104, 105 are not visible in the cross section illustrated in FIG. 2. They are located below the section plane.

Figure 3A:
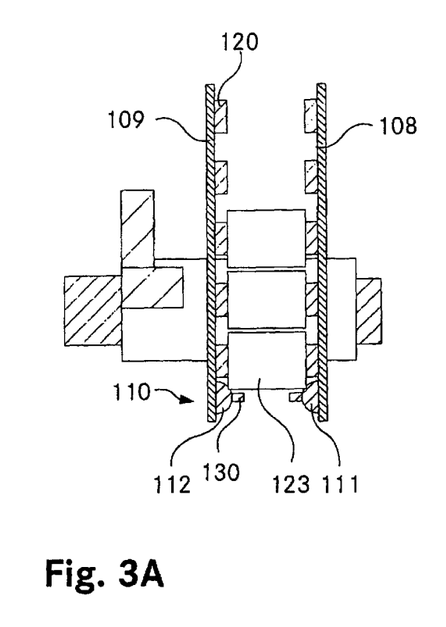
FIGS. 3A,B show schematic illustrations of the functioning of various holding and securing elements of the intermediate store.
Figure 3B:
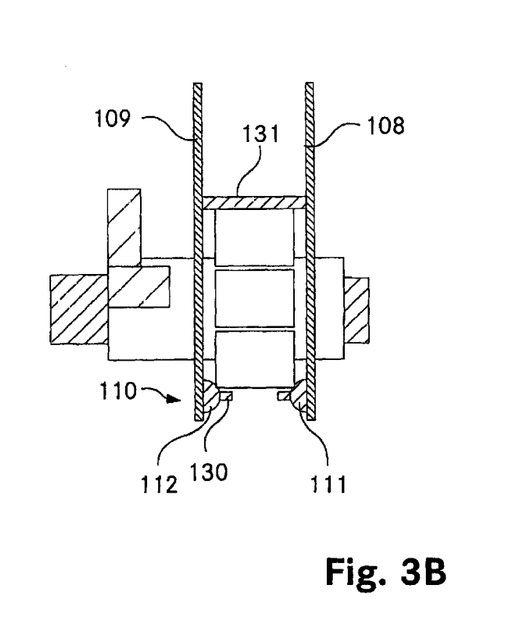

FIGS. 3A and 3B are schematic illustrations of the functioning of various holding and securing elements of the intermediate store. For clarity, the gripping device is not illustrated. FIG. 3A shows an intermediate store in which the containers 123 stored therein are held by extendable fingers 130 arranged at the lower end of the intermediate store and are secured by pressure plates 120 arranged in the side walls 108, 109. The pressure plates 120 are actuated pneumatically and extended at least during the movement of the collecting device over the storage area, in order to prevent the containers 123 in the intermediate store slipping or tilting.

FIG. 3B shows a variant in which the securing function is performed by a vertically movable stabilizing plate 131 instead of by pressure plates. The stabilizing plate 131 is guided in the recesses in the side walls such that it can move only in the vertical direction. On account of its weight, the stabilizing plate 131 acts continually with a certain force on the topmost container. By means of a form fit, this prevents the topmost container tilting and, as a result of increased friction between the stacked containers, also their slipping out between the side walls. Of course, both securing elements, pressure plates and a destabilizing plate, can be used combined.

Figure 4A:
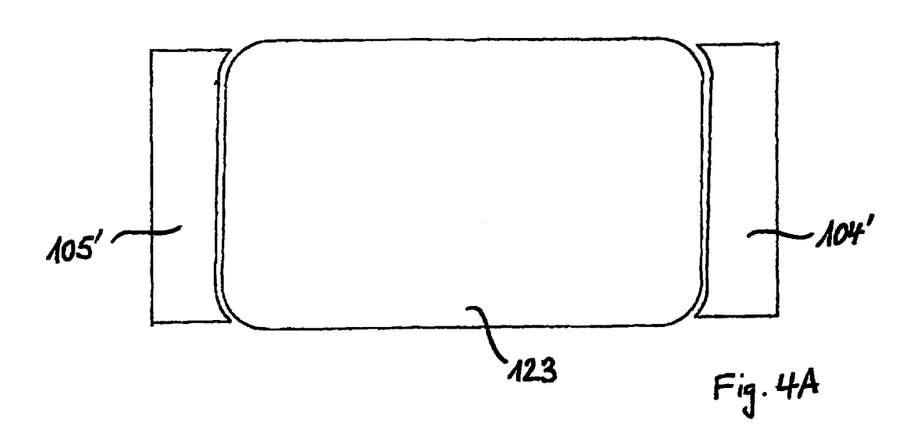
FIGS. 4A,B show a schematic illustration of a securing element for the gripping device of an arrangement according to the invention.
Figure 4B:
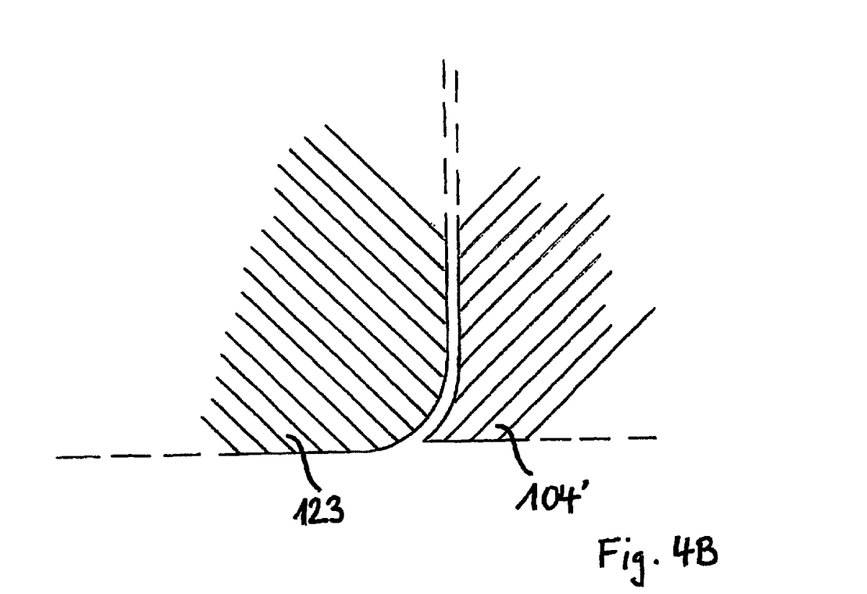

FIGS. 4A and 4B show a securing element for securing the containers 123 against slipping or tilting during the lifting or lowering operation of the gripping device. The securing element is formed by the special shape of the blades 104', 105'. These have, on their inner sides over the entire length or in one or more sections, a cross section which is matched accurately to the boundary of the container 123 on the transverse side of the latter. In the exemplary embodiment illustrated, the container 123 has a substantially rectangular cross section, the four corners being rounded off. The inner side of the blades 104', 105' now has a concave cross section, so that it follows the rounded portions in the corners to some extent. The width of the blades 104', 105' is, however, chosen such that they do not project beyond the lateral boundary surface of the container 123.

The container 123 is prevented both from slipping away horizontally and from tilting by the projecting sections of the blades 104', 105'. The shaping of the blades 104', 105' leads neither to a greater demand for free space between longitudinally adjacent stacks, nor are active, that is to say controllable and movable, elements needed for the securing action. The intermediate store can have securing elements of the same type, which provide the same advantages. Securing elements of the type illustrated also perform, at least partially, the tasks of the calibration part. Therefore, in a design of the arrangement according to the invention having securing elements as in FIG. 4, such a calibration part can optionally be dispensed with.

Figure 5:
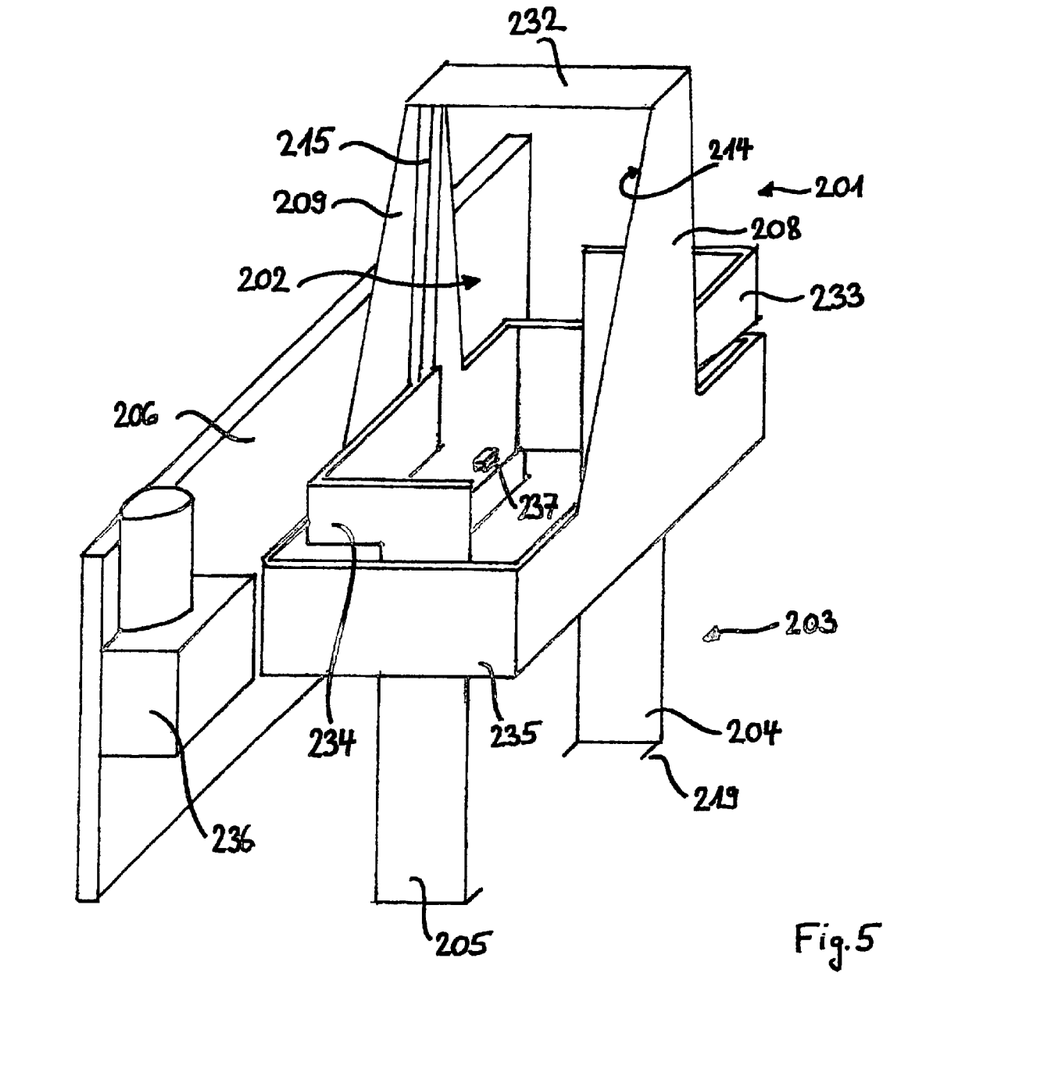
FIG. 5 shows a three-dimensional illustration of another collecting device according to the invention.

FIG. 5 illustrates another collecting device according to the invention three-dimensionally. In this embodiment, the collecting device 201 is again formed by an intermediate store 202 and a gripping device 203. The intermediate store 202 has a closed circumferential frame 235 at its lower end. From the center of the longitudinal sides of the frame 235, in each case a side wall 208, 209 runs vertically upward and, in the embodiment illustrated, becomes narrower from bottom to top. At their upper end, the side walls 208, 209 are joined by a joining web 232, which contributes to the stability of the intermediate store 202 and terminates the latter at the top.

In the side walls 208, 209 there run vertical recesses 214, 215, in which the blades 204, 205 are guided. The blades 204, 205 are joined to the guide via angles 233, 234, so that they are arranged on the transverse side of the intermediate store 202. The vertical planes which are defined by the blades 204, 205 and by the side beams of the intermediate store 202 therefore enclose a space having a substantially rectangular cross section. If containers having a cross section corresponding approximately to this are held in the space, they are secured against horizontal slippage and against tilting.

At their lower end, the blades 204, 205 each have two fingers 219, which can be moved into the region between the blades 204, 205, so that containers can be held as a result. As soon as the containers gripped by the gripping device 203 have been lifted upward into the intermediate store 202, they are fixed there, so that the blades 204, 205 of the gripping device 203 are again free for further pick-up operations. The fixing is carried out by means of a plurality of fingers 237 that can be extended out of the frame 235. These are arranged at the bottom on the longitudinal side of the frame 255, so that they cannot impede the angle 233, 234 during its vertical movement.

The collecting device 201, more accurately its frame 235, is once more fixed such that it cannot move vertically to a base plate 206, which can be moved over the storage area by means of a drive 236.

To stabilize the containers in the gripping device, the blades can also be fitted with pressure plates or other securing elements in this embodiment.

Figure 6A:
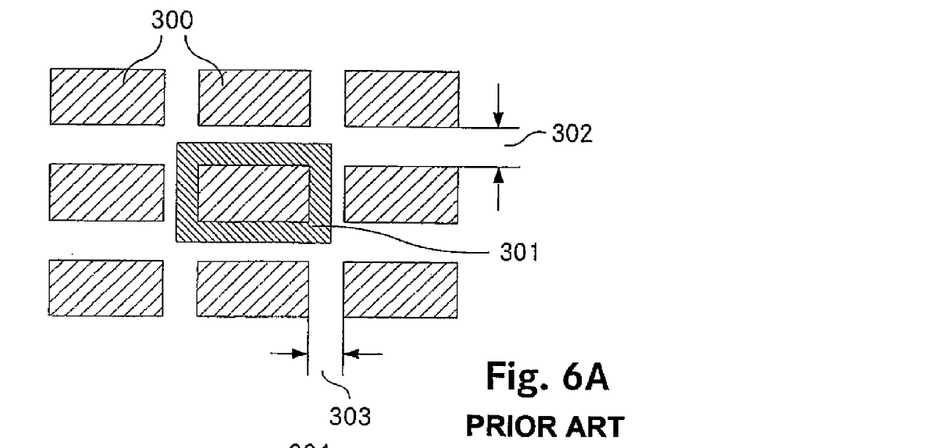
FIGS. 6A,B,C show a schematic demonstration of the space relationships in a warehouse.

FIG. 6 is a schematic illustration of the space relationships in a warehouse. FIG. 6A shows the arrangement of stacks 300 in a storage area which is run by a known arrangement. This arrangement has a substantially frame-like gripping device 301 which embraces the containers of the stack 300. Therefore, a certain amount of free space 302 and 303 is needed on all four sides of the stack in order that the gripping device 301 can move downward in order to pick up or set down one or more containers.

Figure 6B:
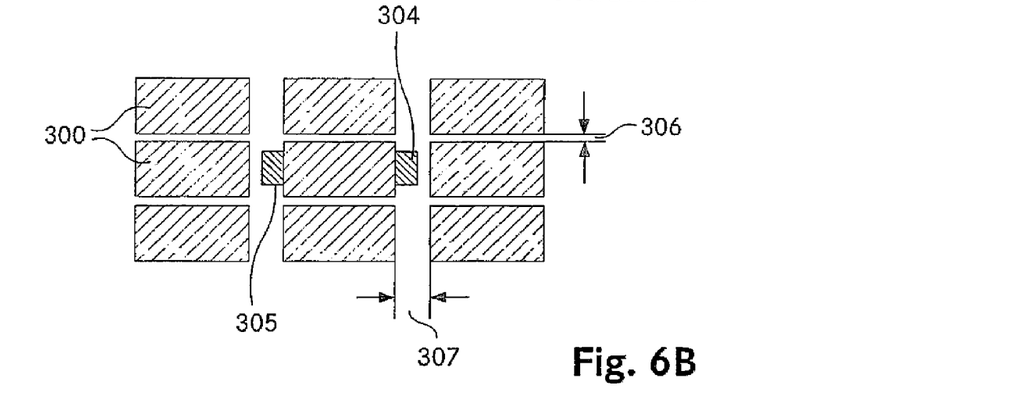
Figure 6C:
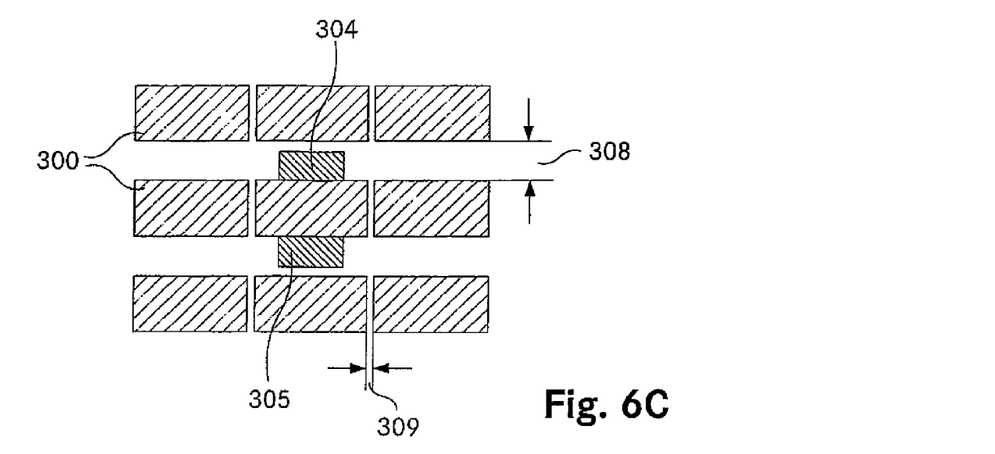

FIGS. 6B, 6C show the space relationships in a warehouse which is run with an arrangement according to the invention. Of the latter, only the two blades 304, 305 are moved into the stacking area, that is to say below the stack height. A free space 308 is needed by the arrangement only on those two opposite sides of the stack 300, on the other two sides the stacks 300 can be arranged as close as possible; the result is a very small free space 309 between adjacent stacks. In FIG. 6B, the blades 304, 305 act on the transverse side of the containers, in FIG. 6C on the longitudinal side. Depending on the shape of the containers and of the storage space, using the same collecting device, the more advantageous arrangement of the stacks 300 and of the collecting device can be chosen.

Figure 7:
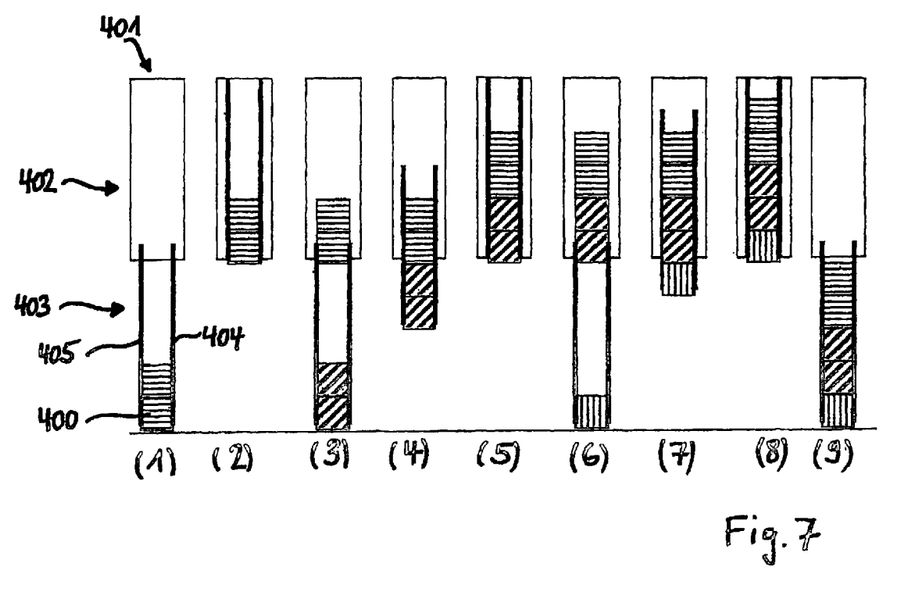
FIG. 7 shows a schematic illustration of the progress of a method according to the invention.

FIG. 7 shows a schematic illustration of the progress of a method according to the invention.

(1) In a first step, two boxes 400 are to be picked up in the collecting device 401. For this purpose, the gripping device 403 with the blades 404, 405 is moved vertically downward until the lower end of the gripping device 403 can grip the lower box to be picked up.

(2) In a next step, the boxes 400 gripped are moved into the intermediate store 402 by lifting the gripping device 403. There, they are fixed and secured against slipping and tilting. The collecting device 401 is then displaced to the next stack from which boxes are to be picked up.

(3) There, once again the gripping device 403 is lowered and again grips two boxes. The containers fixed in the intermediate store 402 initially remain fixed in the lowest two positions in the intermediate store 402.

(4) Next, the boxes newly picked up are lifted by the gripping device 403 to such an extent that the base surface of the part stack stored in the intermediate store 402 rests on the newly lifted part stack.

(5) The holding and securing elements of the intermediate store 402 can then be released. All four boxes in the collecting device 401 are now held by the gripping device 403. The latter is then lifted as a whole, so that the two additional containers likewise arrive in the intermediate store 402. The four stored containers now occupy the lowest four spaces in the intermediate store 402. Once again, all the containers are fixed in the intermediate store 402.

(6) In a next step, the collecting device 401 is moved to a further stack and grips an additional container.

(7) The latter is lifted until a stack consisting of five containers results.

(8) This is again displaced as a whole into the intermediate store 402 and fixed.

(9) After the collecting device 401 has been moved to the destination, the holding and securing elements of the intermediate store 402 are released again and the gripping device 403 is lowered. After the holding elements of the gripping device 403 have been released and the two blades 404, 405 have been withdrawn, the newly formed stack of five containers is set down and the collecting device 401 can form a new stack.

Figure 8:
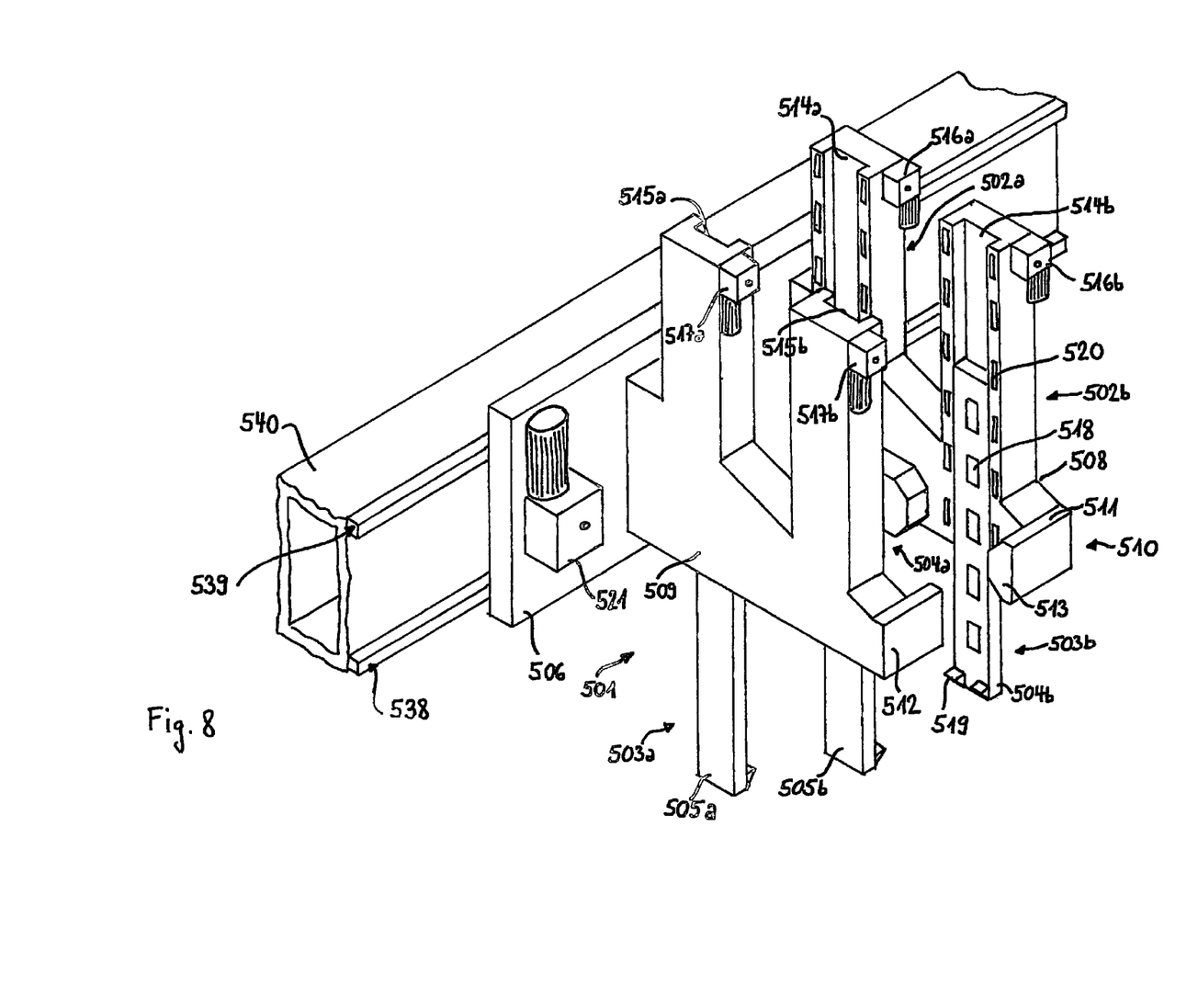
FIG. 8 shows a schematic illustration of an apparatus according to the invention having a plurality of intermediate stores.

FIG. 8 shows a schematic illustration of a collecting device 501 according to the invention having two intermediate stores 502a, 502b. Their structure largely corresponds to the structure of the device illustrated in FIG. 1 with an intermediate store. As distinct from this, the two halves of the device cannot be moved with respect to each other but are arranged on the same base plate 506. This base plate 506 can be moved horizontally by means of a drive 521 on rails 538, 539 which are arranged on a support 540 of the portal. The collecting device 501 comprises two intermediate stores 502a, 502b arranged one behind the other and each having their own gripping devices 503a, 503b. The two halves are formed by the side walls 508 and 509, which are continuous and have recesses 514a and 514b and, respectively, 515a and 515b to accommodate the blades 504a, 504b, 505a, 505b.

The support 540 and the base plate 506 can be moved such that containers from any desired stack can be accommodated in one of the two intermediate stores 502a, 502b. With the device illustrated in FIG. 8, it is thus possible for two stacks to be formed simultaneously. In particular if the two stacks are constructed identically or similarly, the result is a great saving in time since, as compared with two separate order-picking operations, a substantial part of the displacement time can be saved. If multiple stores are used, it may be advantageous to arrange the store in such a way that in each case a plurality of rows of identical containers are arranged directly behind one another. The two intermediate stores 502a, 502b each have their own gripping devices 503a, 503b, which can pick up and discharge containers simultaneously and thus, in relation to picking up and discharging containers, are completely independent of each other. This permits the simultaneous order-picking of two identical orders without any loss of time.

Instead of two intermediate stores, a larger number can also be arranged after one another in the same way. An arrangement of the intermediate stores beside one another on the same base plate is also possible. Instead of providing one gripping device in each case per intermediate store, a plurality of intermediate stores can also be supplied by the same, movable gripping device. In the case of intermediate stores arranged after one another, for example in each case a guide for a blade is arranged on the outer side of the side walls and can be moved horizontally. The fingers at the lower end of the blades are lengthened appropriately in order that a container can be lifted between the side walls. The arrangement of the gripping devices on the outer side of the side walls has the disadvantage, however, of an increased space requirement perpendicular to the side walls and can necessitate a greater spacing between adjacent container stacks.

Figure 9:
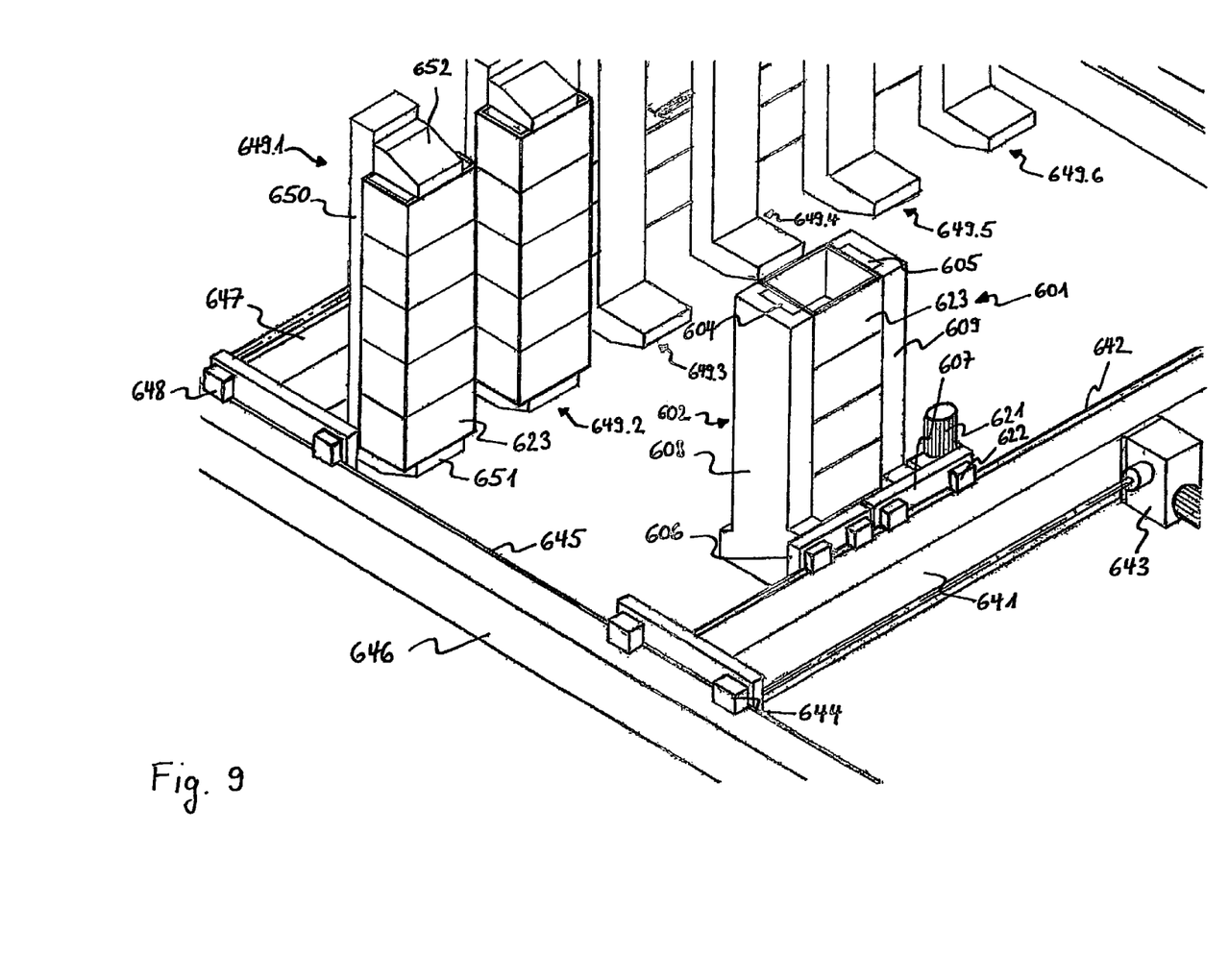
FIG. 9 shows a schematic illustration of a further apparatus according to the invention having additional storage units.

FIG. 9 is a schematic illustration of a further device according to the invention having additional storage units. The device again comprises a collecting device 601, which corresponds substantially to the collecting device illustrated in FIG. 1. The collecting device 601 comprises a vertically immovable intermediate store 602. This is followed by two side walls 608, 609, in which the lateral blades 604, 605 for picking up and setting down containers 623 are also mounted such that they can be displaced vertically. The side walls 608, 609 are fixed to base plates 606, 607, which are supported via guide rollers 622 on a rail 642 of a portal bridge 641. The distance of the base plates 606, 607 from one another can be changed by a drive 621. The collecting device 601 can be displaced along the portal bridge 641.

The portal bridge 641 is mounted via guide rollers 644 at its two ends on rails 645 which are arranged on portal supports 646. The portal bridge 641 comprises a drive 643, by means of which it can be moved along the portal supports 646. A second, identically constructed portal bridge 647 is now mounted parallel to the first portal bridge 641, likewise via guide rollers 648 on the rails 645 of the portal supports 646. A plurality of storage units 649.1 . . . 649.6 are fixedly attached along the second portal bridge 647.

The storage units 649.1 . . . 649.6 are all identical. In the following, they will be described by using the example of the storage unit 649.1. This is formed by a vertical support 650 which is fixed to the portal bridge 647. At the lower end of the vertical support 650, a lower holding part 651 is fixedly arranged. The latter projects and in this way forms a support for the containers 623 to be accommodated in the storage unit 649.1. A further, upper holding part 652 is arranged above the lower holding part 651 and can be displaced in a vertical guide.

In order now to transfer containers 623 held in the intermediate store 602 of the collecting device 601 into one of the storage units 649.1 . . . 649.6, first of all the collecting device 601 is moved along its portal bridge 641 so that it is arranged exactly opposite the relevant empty storage unit. The upper holding part 652 of the storage unit is moved upward. Next, the two portal bridges 641, 647 are moved toward each other until the containers 623 rest with their front sides in relation to the collecting device 601 on the vertical support 650 of the storage unit. The distances between the storage units 649.1 . . . 649.6 are chosen and the lower holding part 651 is dimensioned such that the side walls 608, 609 of the collecting device 601 can be moved unimpeded on both sides of the lower holding part 651. In the case of a collecting device with vertically movable blades, the distance between adjacent storage units must accordingly be chosen to be somewhat larger than between the container stacks in the storage area, between which only the narrower blades reach downward.

The upper holding part 652 of the storage unit is then moved downward, so that the containers 623 are clamped firmly in the storage unit. The distance between the side walls 608, 609 can then be enlarged slightly by the drive 621, and the portal bridge 641 together with its collecting device 601 can be moved away from the storage unit. The transfer can therefore be carried out very quickly and without a vertical movement of the objects 623 held in the intermediate store 602 having to take place. For this reason, no additional free height above the storage area is needed either.

During the filling operation of the collecting device 601, which proceeds in the way described further above with reference to FIGS. 6 and 7, the second portal bridge 647 with the storage units 649.1 . . . 649.6 can in each case follow the first portal bridge 641 at a specific distance, so that the interchange of containers can be carried out within a short time. Alternatively, the second portal bridge 647 can also be moved to one end of the portal supports 646 during the filling operation, in order that the collecting device 601 can move unimpeded over the entire storage area.

In order to set down the containers 623 held in the storage units 649.1 . . . 649.6, both portable bridges 641, 647 are moved into the intended area of the containers 623, that is to say, for example, to the end of the storage area. There, in each case the containers 623 held in one of the storage units 649.1 . . . 649.6 can be removed successively from the collecting device 601 and set down at the desired location by means of the blades 604, 605. The transfer of the containers 623 is carried out in a manner analogous to the transfer described above.

The height of the intermediate store and the height of the gripping device, which is determined by the length of the blades, can be matched to the store to be run. Relevant parameters in this regard are, in particular, the height of the stacks to be formed, the maximum stack height and the available space above the stack height. The intermediate store can quite possibly be higher and can hold a larger number of containers than the gripping device. In this case, it is merely necessary to note that the intermediate store must either be capable of vertical movement or that, otherwise, the height of the stacks to be formed is restricted by the length of the gripping device. The capacity of a vertically immovable intermediate store therefore preferably corresponds to the capacity of the gripping device.

The relative mobility of the two halves of a device according to the invention, for example that illustrated in FIGS. 1, 2, opens up further possibilities. In order to lift a stack, the collecting device can be positioned above the stack and the two halves can be moved slightly away from each other. The gripping device is then moved vertically downward. Because of the slightly increased distance between the two halves and therefore the two blades of the gripping device, this movement can be carried out without any conflict with the stack. As soon as the gripping device has reached its pick-up position, the two halves are moved toward each other with a certain pressure. The containers to be lifted are then held by the force exerted on their side surfaces by the blades. This can further be assisted by (passive) projections fitted permanently on the inner side at the lower end of the blades.

The blades are then lifted in the known way and, as a result, the containers are moved into the intermediate store. In this embodiment of the arrangement according to the invention, it is advantageous if the side walls of the intermediate store have a somewhat larger distance than the inner sides of the blades, so that the transition from the blades into the intermediate store runs smoothly. In the intermediate store, the containers are held at their lower end by extendable fingers, as already described. The length of the fingers is chosen such that, even if the two halves are moved slightly apart again in order to pick up a new part stack, the containers are held in the intermediate store.

Since the mobility of the two halves is used, all the active elements, such as fingers, pawls or pressure plates on the blades, can be saved. The blades can be constructed even more simply and a transfer of power from the intermediate store to the blades is rendered superfluous.

The embodiment of the collecting device for interacting with the additional storage units does not have to correspond to the form illustrated; in particular it does not have to comprise two blades that can be moved downward. For instance, an intermediate store having two side walls that can be moved with respect to each other can also be constructed in such a way that it can be moved vertically. In order to pick up containers, the side walls are moved apart slightly, moved downward on both sides of the containers and moved together again until the containers are held securely between the side walls. The intermediate store can then be moved upward again. The transfer of the objects held in such a collecting device to the storage units can be carried out in exactly the same way as described for the collecting device having extendable blades and a vertically fixed intermediate store.

In summary, it should be recorded that the invention provides an arrangement and a method which permit improved utilization of the available storage space.

The invention claimed is:

1. An arrangement for running a warehouse, in which objects are stored in a plurality of stacks in a storage area, comprising
   a) a collecting device being movable over the storage area in the warehouse, the collecting device for picking up the objects from the stacks, and a portal robot for moving the collecting device over the storage area,
   b) an intermediate store on the movable collecting device, the intermediate store arranged in a fixable location above the storage area of the objects to be picked up on the collecting device to accommodate objects to be picked up from the storage area for filling the intermediate store by successively lifting one object or a plurality of objects from directly below the collecting device from various stacks in separate pick-up steps, whereas the intermediate store is arranged in the fixable location above the storage area as the objects are picked up; and
   c) a gripping device arranged on the collecting device for lifting one object or a plurality of objects from one of the stacks, whereas the gripping device is vertically movable on the collecting device;
whereas
   d) the gripping device is substantially formed by two mutually opposite blades, and whereas
   e) the blades are only vertically movable with respect to the intermediate store while moving objects to or from the intermediate store such that the intermediate store accommodates the one object or the plurality of objects.

2. The arrangement as claimed in claim 1, whereas the collecting device is divided into two mutually opposite halves which can be moved relative to each other.

3. The arrangement as claimed in claim 1 or 2, whereas the intermediate store is substantially formed by two mutually opposite side beams.

4. The arrangement as claimed in claim 3, whereas the blades of the gripping device are mounted in the side beams of the intermediate store.

5. The arrangement as claimed in claim 4, whereas vertical planes which are defined by the blades and by the side beams of the intermediate store enclose a space with a substantially rectangular cross section.

6. The arrangement as claimed in claim 1, whereas the blades comprise on an inner side holding elements for holding the objects.

7. The arrangement as claimed in claim 1, whereas the intermediate store comprises at its upper end a vertically movable element which exerts a force downward on the topmost stored object in order to stabilize the stored stack.

8. The arrangement as claimed in claim 1, whereas the intermediate store comprises holding elements for holding the stored objects.

9. The arrangement as claimed in claim 1, whereas the intermediate store comprises, substantially at its lower end, a calibration part which corrects an orientation of the objects as they are inserted into the intermediate store.

10. The arrangement as claimed in claim 9, whereas the calibration part is formed by two C-shaped adjusting elements.

11. The arrangement as claimed in claim 1, whereas the collecting device comprises a plurality of intermediate stores.

12. The arrangement as claimed in claim 1, whereas the blades comprise on an inner side holding elements for holding securing elements for securing the objects against horizontal movements or tilting relative to the gripping device.

13. The arrangement as claimed in claim 1, whereas the intermediate store comprises securing elements for securing the objects against horizontal movements or tilting relative to the intermediate store.

14. An arrangement for running a warehouse, in which objects are stored in a plurality of stacks in a storage area, comprising
   a) a collecting device being movable over the storage area in the warehouse, the collecting device for picking up the objects from the storage area,
   b) an intermediate store arranged on the collecting device to accommodate objects to be picked up from the storage area, for filling the intermediate store by successively lifting one object or a plurality of objects from various stacks in separate pickup steps,
   c) a gripping device arranged on the collecting device for lifting one object or a plurality of objects from one of the stacks, whereas the gripping device is vertically movable;
and
   d) a plurality of storage units arranged above the storage area in the warehouse and fixed in the vertical direction, the storage units are fixedly arranged on a portal bridge, which can be moved independently of the collecting device, the collecting device being movably arranged above the storage area on a further portal bridge, the storage units and the collecting device located opposite each other above the storage area and the collecting device moving on the further portal bridge for transfer of objects accommodated in the intermediate store of the collecting device directly into the storage units.

15. The arrangement as claimed in claim 14, whereas the storage units are each substantially C-shaped with a base part running vertically and arranged at the rear, and two holding parts held on the base part, arranged centrally and projecting forward, between which the objects can be picked up.

16. A method for operating a warehouse, in which objects are stored in a plurality of stacks in a storage area, comprising the steps of
   a) using a portal robot for moving a collecting device over the storage area in the warehouse to any desired stack having objects to be picked up;
   b) for picking up a stack part from one or more objects of the stack, moving vertically downward a gripping device arranged on the collecting device, the gripping device including two mutually opposite blades which are extended out of the collecting device, an intermediate store arranged on the collecting device, the intermediate store arranged in a fixed location above the storage area as the objects are picked up from directly below the collecting device by the mutually opposite blades;
   c) gripping the stack part by said two mutually opposite blades of the gripping device;

d) moving only vertically upward the gripping device while moving objects to the intermediate store, so that the intermediate store arranged on the collecting device accommodates the objects picked up from the storage area; and
e) filling the intermediate store by successively lifting one object or a plurality of objects from various stacks in further pick-up steps.

17. The method as claimed in claim 16, comprising the further step of securing the objects in the intermediate store during the movement of the collecting device against horizontal movements or tilting relative to the collecting device by securing elements of the intermediate store.

18. The method as claimed in claim 16, comprising the further step of securing the objects gripped by the gripping device, as they move upward, against horizontal movements or tilting relative to the gripping device by securing elements of the gripping device.

19. The method as claimed in claim 16, whereas in order to grip the stack part, two mutually opposite halves of a collecting device are moved toward each other until the blades hold the stack part with a form or force fit.

20. A method for running a warehouse, in which objects are stored in a plurality of stacks in a storage area, comprising the steps of a) moving a collecting device over the storage area in the warehouse to any desired stack having objects to be picked up;
b) accommodating a stack part of one or more objects from the stack in an intermediate store of the collecting device;
c) filling the intermediate store by successively lifting one object or a plurality of objects from various stacks in further pick-up steps; and
d) transferring the objects accommodated in the intermediate store to a storage unit which is independently movable of the collecting device, the collecting device cooperates with the storage unit, a plurality of storage units are fixedly arranged on a portal bridge, the storage units are arranged above the storage area and fixed in the vertical direction, and the collecting device being movably arranged on a further portal bridge, the storage units and the collecting device are located opposite each other and the collecting device moving on the further portal bridge for transfer of an object or objects into the storage units.

* * * * *